United States Patent Office 2,905,723
Patented Sept. 22, 1959

2,905,723

CATALYTIC CONDENSATION OF CERTAIN CARBOHYDRATES WITH AROMATIC HYDROCARBONS AND HALOAROMATIC COMPOUNDS

Carl B. Linn, Riverside, Ill., assignor, by mesne assignments, to Universal Oil Products Company, Des Plaines, Ill., a corporation of Delaware No Drawing. Application December 3, 1956
Serial No. 625,613

17 Claims. (Cl. 260—618)

This application is a continuation-in-part of my copending application Serial No. 441,167, filed July 2, 1954, which is a continuation-in-part of application Serial No. 215,627, filed March 14, 1951, both of said earlier applications being now abandoned.

This invention relates to a process for interacting compounds selected from the group consisting of aromatic hydrocarbons and haloaromatic compounds with certain carbohydrates. The process relates more particularly to the condensation of monosaccharides or simple sugars, naturally occurring desoxy-monosaccharides, omega-carboxy-monosaccharides, and oligosaccharides or compound sugars with compounds selected from the group consisting of aromatic hydrocarbons and haloaromatic compounds in the presence of a Friedel-Crafts metal halide as the reaction catalyst.

An object of this invention is to produce organic materials suitable for use per se or for use as intermediates in the manufacture of detergents, pharmaceuticals, explosives, gelling agents, surface coatings, resins, plasticizers, etc., by reacting a compound selected from the group consisting of aromatic hydrocarbons and haloaromatic compounds with certain carbohydrates. Some of the compounds produced in accordance with the process of this invention are not new. For example, certain "so-called" mono-substituted desoxy-glycoses are described in U.S.P. 2,472,277. Some of these compounds formerly called aryl-substituted-desoxy-glycoses and now more properly named aryl-substituted-desoxy-alditols and aryl-substituted-desoxy-ketitols are produced by the process of the present invention. Furthermore, the preparation of certain diaryl-desoxy-alditols is described in U.S.P. 2,472,276. Some of these compounds are also produced by the process of the present invention. That these compounds are not novel is shown in U.S.P. 2,460,803 wherein diaryl-desoxy-alditols are claimed, among other compounds, as novel compositions. However, certain novel compositions of matter and new compounds have been produced by the process of the present invention as will be set forth hereinafter. Thus, the compounds produced by the process of the present invention can be described as both old, and new or novel.

One embodiment of this invention relates to a process which comprises reacting a compound selected from the group consisting of aromatic hydrocarbons and haloaromatic compounds with a carbohydrate selected from the group consisting of monosaccharides, naturally-occurring desoxy-monosaccharides, omega - carboxy - monosaccharides, and oligo-saccharides in the presence of a catalytic amount of a Friedel-Crafts metal halide at reaction conditions of temperature and pressure to produce a compound selected from the group consisting of an aryl-substituted - desoxy - alditol, aryl-substituted-desoxy-ketitol, a haloaryl-substituted-desoxy-alditol, and a haloaryl-substituted-desoxy-ketitol, and recovering said compound.

Another embodiment of this invention relates to a process which comprises reacting an aromatic hydrocarbon with a carbohydrate selected from the group consisting of monosaccharides, naturally-occurring desoxy-monosaccharides, omega-carboxy-monosaccharides, and oligosaccharides in the presence of a catalytic amount of aluminum chloride at a temperature of from about room temperature to about 100° C. and at a pressure of from about atmospheric to about 100 pounds per square inch to produce a compound selected from the group consisting of an aryl-substituted-desoxy-alditol and an aryl-substituted-desoxy-ketitol, and recovering said compound.

A still further embodiment of this invention relates to a process which comprises reacting a haloaromatic compound with a carbohydrate selected from the group consisting of a monosaccharide, naturally-occurring desoxy - monosaccharides, omega-carboxy-monosaccharides, and oligosaccharides in the presence of a catalytic amount of aluminum chloride at a temperature of from room temperature to about 100° C. and a pressure of from about atmospheric to about 100 pounds per square inch to produce a compound selected from the group consisting of haloaryl-substituted-desoxy-alditols and haloaryl-substituted-desoxy-ketitols, and recovering said compound.

A specific embodiment of this invention relates to a process which comprises reacting benzene with glucose in the presence of a catalytic amount of aluminum chloride at a temperature of from about room temperature to about 100° C. and at a pressure of from atmospheric to about 100 pounds per square inch to produce a phenyl-1-desoxy-glucitol, and recovering said compound.

Another specific embodiment of this invention relates to a process which comprises reacting toluene with glucose in the presence of a catalytic amount of aluminum chloride at a temperature of from about room temperature to about 100° C. and at a pressure of from about atmospheric to about 100 pounds per square inch to produce a p-tolyl-1-desoxy-glucitol, and recovering said compound.

Still another specific embodiment of this invention relates to a process which comprises reacting chlorobenzene with glucose in the presence of a catalytic amount of aluminum chloride at a temperature of from about room temperature to about 100° C. and at a pressure of from about atmospheric to about 100 pounds per square inch to produce a 4-chloro-phenyl-1-desoxy-glucitol, and recovering said compound.

A still further specific embodiment of this invention relates to a process which comprises reacting toluene with fructose in the presence of a catalytic amount of aluminum chloride at a temperature of from about room temperature to about 100° C. and at a pressure of from about atmospheric to about 100 pounds per square inch to produce a p-tolyl-2-desoxy-fructitol, and recovering said compound.

Another specific embodiment of this invention relates to a process which comprises reacting toluene with sucrose in the presence of a catalytic amount of aluminum chloride at a temperature of from about room temperature to about 100° C. and at a pressure of from about atmospheric to about 100 pounds per square inch to produce a compound selected from the group consisting of p-tolyl-1-desoxy-glucitol and a p-tolyl-2-desoxy-fructitol, and recovering said compound.

I have found that useful water-insoluble reaction products and also water-soluble reaction products are formed by reacting aromatic hydrocarbons or haloaromatic compounds with certain carbohydrates in the presence of a Friedel-Crafts catalyst, and particularly in the presence of aluminum chloride. The so-called Friedel-Crafts reaction has previously been extended to the reaction of aromatic hydrocarbons with certain carbohydrate derivatives, namely, the reaction of aromatic hydrocarbons with polyacylglycosyl esters. This reaction as stated hereinabove results in the production of certain of the compounds which are produced by the process of the present invention. However, the polyacylglycosyl esters must first be prepared for use in the above-mentioned process. I have unexpectedly found that this prior formation of polyacylglycosyl halides and polyacylglycosyl acetates is not necessary and that certain carbohydrates, as for example in their naturally occurring states, may be directly reacted with aromatic hydrocarbons and haloaromatic compounds in a still further extension of the Friedel-Crafts reaction. Prior to my discovery it has been considered necessary to protect the functional groups in sugars so that selective reactions could be obtained to yield pure compounds. I have found that such protection is unnecessary and that selective reactions are obtained without such prior protection and preparation of intermediate compounds prior to reaction with an aromatic hydrocarbon or haloaromatic compound. Thus, my discovery results in a further simplification of known processes and makes for more economical production of certain chemical compounds. My reactions may be carried out in steel equipment or in suitable apparatus such as glass or in other suitable apparatus lined with such inert materials as glass, ceramic materials, silver, copper, and certain alloys such as Monel metal, stainless steel, and the like. This reaction may be effected at temperatures of from about 0° C. to about 150° C. and preferably at temperatures of from about room temperature to about 100° C. While any of these reactions are conveniently carried out at substantially atmospheric pressure, it may be desirable in certain instances and with certain reactants to carry out the reaction at higher pressures up to 100 atmospheres or more, although pressures of greater than 100 pounds per square inch are seldom necessary. When utilizing pressure-withstanding equipment, it is convenient in most instances to operate the equipment utilized at the autogenous pressure generated by the reaction mixture contained therein.

It might be considered by some to be predictable that in the presence of a Friedel-Crafts type catalyst some kind of reaction should occur when a reaction mixture contains a carbohydrate and other organic compounds. However, it has unexpectedly been found that selective reaction takes place when certain carbohydrates are reacted with certain other organic compounds. This selective reaction results in high yields of pure compounds. As hereinabove stated, this unexpected and selective reaction takes place in the presence of a Friedel-Crafts catalyst when a carbohydrate selected from the group consisting of monosaccharides, naturally-occurring desoxy-monosaccharides, omega-carboxy-monosaccharides, oligosaccharides are reacted with an aromatic hydrocarbon or a haloaromatic compound. Suitable aromatic hydrocarbons which may be used as starting materials in the process of this invention include benzene, toluene, ortho-xylene, meta-xylene, para-xylene, ethylbenzene, ortho-ethyltoluene, meta-ethyltoluene, para-ethyltoluene, 1,2,3-trimethylbenzene, 1,2,4-trimethylbenzene, 1,3,5-trimethylbenzene, n-propyl benzene, cumene or isopropyl benzene, etc. Other suitable utilizable aromatic hydrocarbons include those with two or more aryl groups such as diphenyl diphenylmethane, triphenylmethane, fluorene, stilbene, etc., and aromatic hydrocarbons which contain condensed benzene rings including naphthalene, alpha-methylnaphthalene, beta-methylnaphthalene, ethylnaphthalene, anthracene, phenanthrene, naphthacene, rubrene, etc. Alkylaromatic hydrocarbons in which the alkyl group contains more than 3 carbon atoms are also utilizable in the process of the present invention but not necessarily with equivalent results. This is due to the fact that aluminum chloride also acts as a cracking catalyst for such long chain alkyl aromatic hydrocarbons, and thus when such long chain alkyl aromatic hydrocarbons are utilized in the process of this invention, cracking of the alkyl group may occur. In spite of this, condensation will take place but not necessarily with the production of the simple derivative or product which might have been desired from the reactants. Such alkylaromatic hydrocarbons are often referred to in the art as alkylate and are often produced by the alkylation of simpler aromatic hydrocarbons with olefinic polymers. Such aromatic hydrocarbons include hexylbenzene, hexyltoluene, nonyltoluene, dodecylbenzene, dodecyltoluene, etc. As stated hereinabove, in addition to aromatic hydrocarbons, haloaromatic compounds are also utilizable in the process of the present invention to produce high yields of desired products. Typical haloaromatic compounds utilizable as starting materials within the scope of this invention include fluorobenzene, chlorobenzene, bromobenzene, iodobenzene, ortho-chlorotoluene, meta-chlorotoluene, para-chlorotoluene, ortho-bromotoluene, meta-brmotoluene, para-bromotoluene, ortho-chloroethylbenzene, meta-chloroethylbenzene, para-chloroethylbenzene, ortho-dichlorobenzene, para-dichlorobenzene, 1,2,4-trichlorobenzene, para-dibromobenzene, ortho-bromochlorobenzene, para-bromochlorobenzene, alpha-chloronaphthalene, beta-chloronaphthalene, alpha-bromonaphthalene, etc. As stated hereinabove, these two classes of aromatic compounds, namely, aromatic hydrocarbons, and haloaromatic compounds are particularly suitable for this further extension of the so-called Friedel-Crafts reaction.

From the above description, it is obvious that not all unmodified or naturally occurring carbohydrates are equivalent in the process of this invention. Thus, it has been found that polysaccharides are unreactive with aromatic hydrocarbons or haloaromatic compounds in the process of this invention. However, it has been demonstrated and will be illustrated in the examples appended to these specifications, that both monosaccharides and disaccharides can be utilized in the described process to produce the desired compounds. One other feature of the process of this invention is that the carbohydrate starting materials utilized are sugars. In some prior art processes which have resulted in the production of some of the compositions produced herein, the starting materials have been modified so that they can no longer be considered to be true sugars. Therefore, as set forth hereinabove, the process of the present invention results in a more direct and economical method for producing certain known compounds as well as producing certain new and novel compositions of matter. Thus, carbohydrates which are condensed with aromatic hydrocarbons and haloaromatic compounds in the process of the present invention include monosaccharides or simple sugars, naturally occurring desoxy-monosaccharides, omega-carboxy-monosaccharides and oligosaccharides or compound sugars. Monosaccharides or simple sugars include dioses, trioses, tetroses, pentoses, hexoses, heptoses, octoses, nonoses, and decoses. Oligosaccharides or compound sugars include particularly disaccharides, and also trisaccharides, and tetrasaccharides.

Utilizable simple sugars include the diose, glycolaldehyde; trioses such as glyceraldehyde and s-dihydroxylacetone; tetroses such as erythrose, threose, erythrulose, and apiose; the pentoses such as arabinose, xylose, ribose, lyxose, and ketoxylose; the hexoses such as mannose, glucose, idose, gulose, galactose, talose, allose, altrose, fructose, sorbose, tagatose, and psicose; heptoses such as glucoheptose, mannoheptose, galactoheptose, sedoheptose, mannoketoheptose, glucoheptulose, and perseulose; octoses such as glucooctose, mannooctose, and galactooctose; nonoses such as gluconoose, and mannononoses; and decoses such as glucodecose. Similarly, naturally-occurring desoxy-derivatives of simple sugars are utilizable in this process. These desoxy-derivatives of simple sugars are formed by the replacement of a hydroxyl group in a sugar with hydrogen resulting only in the elimination of one oxygen atom thereby forming a methyl or methylene linkage where a hydroxylmethyl or hydroxyl methylene linkage had previously occurred. The desoxy-pentoses and desoxy-hexoses are the most commonly occurring of such compounds and include rhamnose (a desoxy-hexose), fucose (a desoxy-hexose), rhodeose (a desoxy-hexose), 2-desoxy-ribose (a desoxy-hexose), and 2-desoxy-methyl-pentose (a desoxy-hexose). The omega-carboxy-derivatives of simple sugars, which are suitable in the process of the present invention include tartronic semialdehyde or its tautomer, hydroxypyruvic acid, α,γ-dihydroxyaceto-acetic acid, threuronic acid, 4-keto-2,3,5-trihydroxypentanoic acid, xyluronic acid, 5-keto-hexanoic acids such as 5-keto-allonic acid, 5-keto-gluconic acid, 5-ketomannonic acid, 5-ketogulonic acid, and 5-keto-galactonic acid, uronic acids such as glucuronic acid, mannuronic acid, and galacturonic acid, and the 6-keto-heptanoic acids. The simple sugars and their omega-carboxy-derivatives, as starting materials for the process of this invention, may be represented by the following general formula:

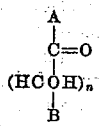

in which A=H and CH₂OH, n=an integer from 1 to about 12 or so, and B=H, CH₂OH, and COOH. As an example of the utility of this general formula when A=H, n=1, B=H, the compound is glycolaldehyde; when A=H, n=1, and B=CH₂OH, the compound is glyceraldehyde; when A=H, n=1, and B=COOH, the compound is tartronic semialdehyde, a tautomer of hydroxypyruvic acid; when A=CH₂OH, n=1, and B=H, the compound is s-dihydroxyacetone; when A=CH₂OH, n=1, and B=CH₂OH, the compound is erythrulose; when A=CH₂OH, n=1, and B=COOH, the compound is α,γ-dihydroxyacetoacetic acid; when A=H, n=2, and B=CH₂OH, the compound is erythrose, or threose; when A=H, n=2, and B=COOH, the compound is threuronic acid; when A=CH₂OH, n=2, and B=CH₂OH, the compound is riboketose, or xyloketose; when A=CH₂OH, n=2, and B=COOH, the compound is 4-keto-2,3,5-trihydroxypentanoic acid; when A=H, n=3, and B=CH₂OH, the compound is ribose, arabinose, xylose, or lyxose; when A=H, n=3, and B=CH₂OH, the compound is xyluronic acid; when A=CH₂OH, n=3, and B=CH₂OH, the compound is psicose, fructose, sorbose, or tagatose; when A=CH₂OH, n=3, and B=COOH, the compound is a 5-ketohexanoic acid; when A=H, n=4, and B=CH₂OH, the compound is allose, altrose, glucose, mannose, gulose, idose, galactose, or talose; when A=H, n=4, and B=COOH, the compound is a uronic acid; when A=CH₂OH, n=4, and B=CH₂OH, the compounds are heptoses; and when A=CH₂OH, n=4, and B=COOH, the compounds are 6-ketoheptanoic acids. In any of the above formulae when the hydroxyl group is replaced by a hydrogen atom, desoxy sugars are formed as hereinabove set forth. These desoxy sugars are includable within the scope of the utilizable compounds. It should be noted however that such compounds are still sugars and are not desoxy sugar derivatives comprising solely polyhydroxy alcohols the use of which has been disclosed in the prior art. Such prior art compounds have had the oxygen atom which comprises the reducing function of the sugar replaced, and thus can no longer be called sugars and are not within the scope of the disclosed process.

The utilizable oligosaccharides or compound sugars include disaccharides such as the pentose-hexose saccharides including glucoapiose, vicianose, and primeverose; the methyl-pentose-hexose saccharides including glycorhamnoside, and rutinose; and the dihexoses such as turanose, maltose, lactose, cellobiose, gentiobiose, melibiose, sucrose, and trehalose. Other compound sugars are represented by trisaccharides such as the methylpentose-hexose saccharides including rhaminose, and robinose; the trihexose saccharides such as mannotriose; and the trihexoses including raffinose, melezitose, and gentianose. An example of a suitable tetrasaccharide is stachyose. Of the above disclosed oligosaccharides which are operable, the disaccharides are preferred and of the disaccharides, the dihexoses are preferred.

In my co-pending application Serial No. 360,838, filed July 10, 1953, now Patent 2,798,098, July 2, 1957, is disclosed the reaction of hydrocarbons with carbohydrates catalyzed by hydrogen fluoride. In this application it is shown that polysaccharides are interchangeable with mono- and disaccharides. It has been found in the process of this application, however, that polysaccharides are inoperable. Thus, in contrast to the above application wherein cellulose and glucose were interchangeable, in the process of this invention, cellulose is inoperable. In a similar manner, other polysaccharides cannot be utilized here.

Friedel-Crafts metal halides which are used in catalytic amounts in this process comprise aluminum bromide, aluminum chloride, antimony pentachloride, beryllium chloride, bismuth chloride, ferric bromide, ferric chloride, gallium trichloride, stannic bromide, stannic chloride, titanium tetrabromide, titanium tetrachloride, zinc chloride, zinc bromide, zirconium chloride, etc. For the purposes of this specification and the appended claims, boron trifluoride is considered to be a Friedel-Crafts metal halide. These Friedel-Crafts metal halides may, in some instances, be utilized along with a promoting amount of a hydrogen halide such as hydrogen fluoride, hydrogen chloride, or hydrogen bromide, the halogen in the hydrogen halide preferably being the same as the halogen in the Friedel-Crafts metal halide. Particularly preferred Friedel-Crafts metal halides comprise aluminum chloride and aluminum bromide. Furthermore, a mixture of one or more of the Friedel-Crafts metal halides may be utilized particularly when it is desired to have the catalyst in liquid form. Thus, a mixture of aluminum chloride and antimony pentachloride, or a mixture of aluminum chloride and stannic chloride are operable and sometimes advantageous to use. The aluminum halide and boron trifluoride catalysts used in the process may also be modified by the addition thereto of certain proportions of an alcohol, ether, nitrohydrocarbon, or other solvent. The alcohols and ethers are used preferably in the amounts needed to produce monoalcohols and monoethers of these Friedel-Crafts metal halides. Of such catalysts, a particularly useful combination formed by mixing aluminum chloride and/or aluminum bromide with a nitrohydrocarbon such as nitrobenzene, or a nitroparaffin such as nitromethane, nitroethane, a nitropropane, a nitrobutane, or another nitroalkane containing 5 or more carbon atoms per molecule.

This process may be carried out by slowly adding a Friedel-Crafts metal halide in the requisite catalytic amount, or a mixture of Friedel-Crafts metal halides, or a mixture of Friedel-Crafts metal halide and, for example, a nitroparaffin to a stirred mixture of an aromatic hydrocarbon or a haloaromatic compound and a carbohydrate chosen from the above-described classes while said stirred mixture is subjected to a reaction temperature of from about 0° to about 105° C., preferably from about room temperature to about 100° C., the temperature being maintained by suitable cooling and/or heating means. Conversely, the carbohydrate can be added to a stirred mixture of the aromatic hydrocarbon or haloaromatic compound and Friedel-Crafts metal halide. It is sometimes desirable to commingle the reactants and catalyst all together at a relatively low temperature such as from about −80° C. to about −30° C. and then to permit the reaction mixture to warm gradually while the reactants and catalyst are stirred by suitable mixing means such as a motor driven stirrer or other suitable mixing equipment. While the molar quantity of aromatic compound which reacts with a molar quantity of monosaccharide unit is seldom more than two, larger quantities of aromatic are often present in the reaction mixture for ease of operation. After the catalyzed reaction between the aromatic hydrocarbon or haloaromatic compound and the carbohydrate reaches the desired stage of completion, which stage can be determined usually by the suspension of hydrogen halide evolution, the used catalyst or used catalyst sludge is separated from the organic reaction product. This can be accomplished in a variety of manners. In one method, the reaction products and catalyst are allowed to separate into layers, the catalyst is removed as a lower layer, and water is added to the reaction products. The water is then neutralized, for example, by the addition of ammonium hydroxide until a pH of 7 is attained and Friedel-Crafts metal hydroxide such as aluminum hydroxide which precipitates is removed by filtration. Since both water-soluble and water-insoluble products are formed, the resultant water-solution and wash waters and hydrocarbon layers must be concentrated and the desired products recovered therefrom by known techniques. This separation can be accomplished by the use of different solvents in which the reaction products have varying solubilities.

The amount of Friedel-Crafts metal halide, particularly aluminum chloride, which is used as a so-called catalyst in the process of the present invention must be such so that at least about one molar equivalent of metal halide is utilized with respect to the amount of carbohydrate of the type hereinabove specified. Larger amounts of aluminum chloride may be used depending on the particular reaction product desired. Thus, up to 6 molar equivalents of aluminum chloride may be utilized for a pentose, 7 molar equivalents for hexose, and 8 molecular equivalents of aluminum chloride for a heptose.

I have also found it desirable, on occasion, to employ stannic chloride in the reaction system along with aluminum chloride in order to give a liquid catalyst phase. The stannic chloride per se may modify the reaction; however, its function is intended to be mainly physical.

It should be noted that these Friedel-Crafts metal halides, particularly aluminum chloride or aluminum bromide, act not only as catalysts but as reagents in the reaction. Hydrogen halides are evolved in large quantities, usually in an amount such that one mole of hydrogen halide is evolved per mole of hydroxyl groups in the starting carbohydrate. The catalyst as introduced is not recovered as such after the reaction and in this sense it may be added that these Friedel-Crafts metal halides do not simply act as catalysts in the narrow sense of the term, but act as both catalysts and reagents in the reaction.

As stated hereinabove, the organic reaction products and used catalyst sludge separate as layers which may be recovered separately, the used catalyst sludge being in a form suitable for recycling to the process. The organic reaction product or layer is then subjected to suitable washing, drying, and separation in order to recover the condensation products formed by the reaction of the charged aromatic hydrocarbon or haloaromatic compound with the particular carbohydrate utilized. The organic reaction product may also be separated from the used catalyst by means of an organic solvent such as alcohol or an ether in which most of the organic material may be dissolved. Thus, the product formed by reacting toluene with glucose in the presence of aluminum chloride may be separated into an alcohol-soluble and water-insoluble product and into an alcohol-insoluble and water-soluble product. Furthermore, a product may also be isolated from the excess toluene utilized, this product being insoluble in both water and alcohol.

The type of product obtained in this process is dependent not only upon the chosen starting material but also upon the conditions of the reaction employed. This will be further illustrated in the examples. However, by way of example herein, in the interaction of glucose and toluene, lower temperatures, minimum amounts of catalyst, and/or shorter contact times give higher yields of water-soluble reaction products. Conversely, improved yields of water-insoluble reaction products in the interaction of glucose and toluene is obtained at higher temperatures, with greater than minimum amounts of catalyst, and/or longer contact times.

The reaction products of this process lead to materials having diversified uses. Some of these are enumerated as follows:

(a) Detergents:
  (1) *Sulfonate type.*—Sulfation of the products lead to compounds of the R—$SO_3H$ type which can be converted into surface active salts. Further, in some instances, compounds may be directly prepared having the R—$SO_3H$ structure.
  (2) *Sulfate type.*—Sulfation of these products lead to compounds of the $ROSO_3H$ type which, if desired, can be converted into salts.
  (3) *Nonionic type.*—The substituted products are water-soluble to different degrees depending upon the size and nature of the substituent. Thus, for example, it is possible to make a series of surface-active agents with increasing hydrophobic-hydrophilic ratio in the molecule by reacting glucose with different aromatic hydrocarbon derivatives.
  (4) *Detergent aids.*—The structure of some of the products are related to compounds found useful as detergent aids (that is, compounds which when added to a detergent in small concentrations rather markedly increase their effectiveness). They may accordingly find use in that field.

(b) Surface coatings and resins: Some of the reaction products can be used per se as surface coating materials. Resins can be made by heating many of the reaction products with formaldehyde, urea, phenol, aniline, etc., and combinations of the above-enumerated compounds. A specific example of the utility of some of these reaction products is given in U.S.P. 2,722,521. For example, it is shown therein that a resin is readily prepared by heating together one part by weight 1,1-di-p-tolyl-1-desoxy-glucitol and 2.5 parts by weight of phthalic anhydride at a temperature of 200° C. to about 250° C. for a time of 20 minutes. Further specific utility is illustrated by a study of the specification of the hereinabove referred to patent.

(c) Explosives: Nitration of many of the reaction products will give explosives. These explosives will contain in some instances nitro groups attached to aromatic rings as well as being nitro-alcohol derivatives.

(d) Fermentation: The conversion of many of the reaction products into other useful chemicals such as plastics, etc. can be accomplished by employing the products as a substratuum for growing certain species of bacteria. It has been observed that water concentrations of some of these products support the growth of fungi.

(e) Pharamaceuticals: Since many of the products which can be prepared by the present process are either completely new in constitution, or hitherto unavailable in appreciable amounts and combine the chemistry of carbohydrates on one hand, and of certain aromatic compounds on the other hand, they open up a completely new field of substances adaptable for use in medicinal chemistry or in general chemical synthesis.

(f) Gelling agents: Various reaction products are effective for gelling paraffinic or aromatic hydrocarbons. Thus, for example, a small quantity of one of the reaction products of toluene and fructose gels benzene, and pentane to a lesser extent.

(g) Plasticizers: It is possible to balance the hydrophobic and hydrophilic parts of the molecule, going all the way from water-soluble hydrophilic materials to hydrophobic acting compounds, wherein the hydrocarbon or aromatic derivative part predominates over the oxygenated part, thus producing new plasticizing agents.

Examples of aryl-substituted desoxy-alditols prepared by the process of this invention include mono- and di-substituted compounds including 1-phenyl-1-desoxy-glucitol, 1,1-di-phenyl-1-desoxy-glucitol, 1-p-tolyl-1-desoxy-glucitol, 1,1-di-p-tolyl-1-desoxy-glucitol, 1-(3,4-dimethylphenyl)-1-desoxy-glucitol, 1,1-di-(3,4-dimethylphenyl)-1-desoxy-glucitol, 1-p-ethylphenyl-1-desoxy-glucitol, 1,1-di-p-ethylphenyl-1-desoxy-glucitol, etc. These examples are of compounds prepared utilizing glucose as the carbohydrate reactant and similar derivatives are obtained when other aldoses are utilized. In a similar manner, haloaryl-substituted desoxy-alditols include 1-(4-chlorophenyl)-1-desoxy-glucitol, 1,1-di-(4-chlorophenyl)-1-desoxy-glucitol, 1-(4-bromophenyl)-1-desoxy-glucitol, 1,1-di-(4-bromophenyl)-1-desoxy-glucitol, etc. The production of aryl-substituted desoxy-alditols and haloaryl-substituted desoxy-alditols can be illustrated by the following equation in which glucose is utilized as the carbohydrate reactant:

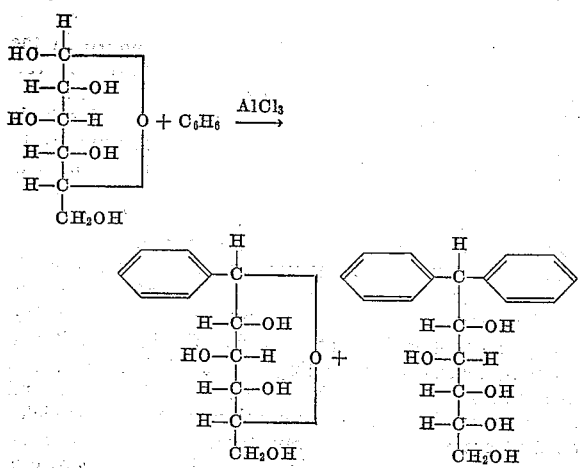

In a like manner the reaction of aromatic hydrocarbons or haloaromatic compounds with ketose sugars can be exemplified. In all of these reactions either the mono-substituted or di-substituted compounds can be obtained depending upon the conditions utilized. Ordinarily, however, a mixture of both compounds is obtained.

The nature of this invention is illustrated further by the following examples which, however, should not be construed to limit unduly the generally broad scope of this invention.

These examples were all carried out in a similar manner. The reactions were conducted in a glass alkylation apparatus equipped with an inlet tube for adding hydrogen chloride, if desired, a thermometer well, a mercury sealed stirrer, and a water cooled reflux condenser. The reactants were contacted for a specified time while maintaining the temperature by means of a water bath. In some of the experiments hydrogen chloride gas was passed into the flask during contacting. At the end of contacting, the reaction mixture was hydrolyzed with ice and cold water, and any insoluble product was removed by filtration. In each instance the aromatic reactant was utilized in molar excess over the carbohydrate. The filtrate was neutralized with caustic and the precipitate removed by filtration. Subsequent separations are described further in the following examples.

EXAMPLE I

This example illustrates the reaction of d-glucose and benzene to produce as one of the reaction products an aryl-1-desoxy-glucitol. These experiments were carried out in the above-described alkylation flask. In each case, a large molar excess of benzene was utilized, ranging from a 22:1 to 17:1 molar excess. The aluminum chloride was utilized in a molar ratio based upon d-glucose of from 5.5:1 to 0.5:1. The results of several experiments using different conditions are summarized in the following table:

Table I

Reaction of d-glucose and benzene

| Experiment No. | 1 | 2 | 3 | 4 |
|---|---|---|---|---|
| Charge, grams: | | | | |
| d-Glucose | 36 | 36 | 36 | 36 |
| Benzene | 342 | 266 | 266 | 267 |
| Anhydrous aluminum chloride | 144 | 54 | 13 | 13 |
| Mol ratio, AlCl₃/d-glucose | 5.5 | 2.1 | 0.5 | 0.5 |
| Anhydrous hydrogen chloride (hours of addition) | 0 | 0 | 0 | 17 |
| Conditions: | | | | |
| Time, hours | 8 | 5 | 17 | 16.75 |
| Temp., °C | 50–80 | 57–81 | 60–82 | 50–72 |
| Results: Total aromatic-free product, grams | 60 | 36 | 111 | 28 |
| Composition: | | | | |
| Water-soluble ᵃ | 4 | 18 | 11 | 25 |
| Water-insoluble— | | | | |
| Alcohol-soluble ᵇ | 47 | 12 | 0 | 0 |
| Benzene-soluble (other than alcohol-soluble) | 9 | 4 | ------ | 3 |

ᵃ Greater than 90% pure compound, partially inorganic. M.P. 167° C.
ᵇ Greater than 90% 1,1-diphenyl-desoxy-D-glucitol.

The alcohol-soluble, water-insoluble residue separated from experiments 1 and 2, in each instance was recrystallized several times from boiling water. A compound insoluble in benzene was isolated. This pure compound melts at 154.5–155.5° C. and has the following elemental analysis: calculated for $C_{18}H_{22}O_5 \cdot H_2O$; C, 64.27%; H, 7.19%; found: C, 64.29%; H, 7.26%. The above elemental analysis corresponds to 1,1-diphenyl-1-desoxy-D-glucitol. The melting point checks with that for the same compound disclosed in U.S.P. 2,460,803, column 6, line 19. Thus, the reaction results in the production of an aryl-desoxy-alditol.

The water-soluble compound was isolated after evaporation of the original pentane-washed filtrate and after treatment thereof with methyl Cellosolve and with 1,4-dioxan. This pure compound has a melting point of 167° C. when crystallized from absolute methanol. The elemental analysis for this compound crystallized from water and ethanol is as follows: carbon, 34.28%; hydrogen, 6.01%; ash, 12.08%. The elemental analysis of the compound crystallized from absolute methanol is as follows: carbon, 34.28%; 5.91% hydrogen; as, 13.04%. This compound, as stated above, is water soluble and is slightly soluble in boiling ethanol, fairly soluble in boiling methanol, and dissolves in 10% caustic with a deepening in color from water white to amber upon heating. This color decreases upon acidification. This compound may be an organo metallic complex containing aluminum.

EXAMPLE II

This example illustrates the reaction of d-glucose and toluene. Into a glass alkylation flask as described hereinabove was placed 264 grams of toluene, 50 grams of d-glucose, and 50 grams of anhydrous aluminum chloride. Thus, a large molar excess of toluene was utilized along with an aluminum chloride to glucose ratio of 1:4. Anhydrous hydrogen chloride was continuously added to the reaction mixture over a period of 4.5 hours while the temperature of the mixture was kept near 0° C. by means of an ice bath.

After hydrolysis of the aluminum chloride, neutralization and filtration, a two phase system was obtained. This two phase system also contained a solid material. The total product was extracted several times with n-pentane, the n-pentane was removed therefrom by de-n-pentane, the n-pentane was removed therefrom by decantation, and the water solution was filtered. The precipitate which was recovered was recrystallized from boiling water yielding pure 1,1-di-para-tolyl-1-desoxy-D- glucitol, melting point 155° C. This melting point checks with that given in the literature for the same compounds.

From the several pentane extracts, 3.5 grams of a high boiling liquid was separated. From this liquid there was also isolated further quantities of 1,1-di-para-tolyl-1-desoxy-D-glucitol.

EXAMPLE III

This example illustrates the reaction of glucose and chlorobenzene. Thirty-six grams of d-glucose, 226 grams of chlorobenzene, and 133.4 grams of anhydrous aluminum chloride were added to the above-described alkylation flask. Again, a large excess of aromatic compound, in this case, chlorobenzene was utilized and the aluminum chloride to glucose mole ratio is 5.0:1. For the reaction, a temperature of 50-82° C. was utilized and the reactants were contacted in the presence of the catalyst for about 4 hours' time.

After hydrolysis, the product was filtered under suction. By this method, 52 grams of a yellow solid was separated, melting point about 145° C.; after two recrystallizations from water a pure compound was recovered, melting at 156-157° C. A sodium fusion gave a strong test for chlorine and the compound did not show reducing properties when tested with modified Schiff's reagent. The recrystallized product, 1,1-di-(4-chlorophenyl)-1-desoxy-D-glucitol had the following elemental analysis: carbon, 54.07%; hydrogen, 5.49%; and chlorine, 17.90%. This analysis compares satisfactorily with that calculated for $C_{18}H_{20}O_5Cl_2 \cdot H_2O$: carbon, 53.34%; hydrogen, 5.47%; chlorine, 17.49%. One gram of the above pure product was oxidized with alkaline potassium permanganate and yielded 4,4'-dichlorobenzophenone, the expected oxidation product. This oxidation product was identified by its melting point of 142.5-143° C. in comparison to that given for 4,4'-dichlorobenzophenone in Beilstein, volume VII, page 420, which lists the melting point of this compound as 144-145° C. The elemental analysis found for this 4,4'-dichlorobenzophenone was as follows: carbon, 62.05%; hydrogen, 3.40%; and chlorine 28.32%. This compares closely to that calculated for $C_{13}H_8OCl_2$ which is as follows: carbon, 62.18%; hydrogen, 3.21%; and chlorine, 28.24%.

The liquid portion of the reaction product consisted of a water layer and an organic layer. This liquid product was extracted with n-pentane and the more soluble solid product settled out and was removed by filtration. The pentane extract yielded two grams of an amber solid. The solid product which settled out and which was removed by filtration was a light tan solid which was dissolved in alcohol. Upon evaporation of this alcohol solution to dryness, 16 grams of an amber glass was recovered. From this amber glass additional 1,1-di-(4-chlorophenyl)-1-desoxy-D-glucitol crystallizes in the form of white needles. This new composition of matter is soluble in alcohol and slightly soluble in boiling benzene. Its structure is given as follows:

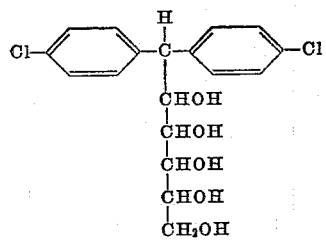

EXAMPLE IV

This example illustrates the reaction of a ketose sugar, fructose, with toluene. Four different experiments were carried out in the same manner as described hereinabove. The results of these experiments are summarized in the following table:

Table II
REACTION OF FRUCTOSE AND TOLUENE

| Experiment No. | 5 | 6 | 7 | 8 |
|---|---|---|---|---|
| Charge, grams: | | | | |
| Toluene | 260 | | | |
| Fructose | 36 | | | |
| Anhydrous aluminum chloride | 134 | | | |
| Mole ratio, AlCl₃/fructose | 5 | | | |
| Anhydrous HCl addition, hours | 5.5 | 0 | 0 | 0 |
| Experimental conditions: | | | | |
| Time, hours | 5.5 | 3 | 3 | 3 |
| Temp. ° C | 0 | 26-42 | 26-42 | 32-81 |
| Results: | | | | |
| Total organic product | 28 | 45 | 37 | 56 |
| Water soluble | 24 | 11 | | 8 |
| Toluene soluble | 4 | 7.6 | 27.5 | 34 |
| Water and toluene soluble | 0 | 26.7 | 9.5 | 14 |

In experiment 5 the reaction was carried out at 0° C. for 5.5 hours with continuous hydrogen chloride addition. Indication of reaction was obtained from the toluene-soluble segment from which a tan solid was recovered. It was obvious, however, that these conditions were not optimum.

Experiment 6 was carried out near 40° C. by contacting the reactants for 3 hours' time. As shown in the above table, the reaction product was separated, after hydrolysis, into a water-soluble segment, a toluene-soluble segment, and into a water and toluene insoluble segment. The water-soluble segment amounting to 11 grams was a soft light amber tacky product soluble in methanol and propanol and somewhat soluble in hot acetone. It was not characterized further. The toluene-soluble segment was a light amber product of a soft and tacky nature. By extraction, this toluene-soluble segment was separated into 1.5 grams of pure diaryl product which separated as white platelets from isopropyl alcohol melting at 190-195° C., into about one gram of hydrocarbon melting at 200-210° C., and into five grams of undetermined product. The water and toluene insoluble product amounting to 26.7 grams yielded 21.4 grams of crude ditolyl fructitol melting at 197-199° C. after recrystallization from alcohol. There was also 5.3 grams of undetermined product in this water and toluene insoluble material.

In a like manner in experiment 7 there was recovered 16.0 grams of ditolyl fructitol from the toluene-soluble segment and 9.5 grams from the water-insoluble toluene-insoluble segment. The same product was again isolated in experiment 8. This di-tolyl-fructitol after recrystallization from isopropyl alcohol was found to have a metling point of 199-200° C. It was also found to contain by elemental analysis 72.80% carbon and 7.84% hydrogen. These quantities are in accord with the calculated values for $C_{20}H_{26}O_4$ containing 72.70% carbon and 7.93% hydrogen. Since the empirical formula by elemental analysis is $C_{20}H_{26}O_4$, the compound incorporates one fructose residue with two tolyl units, having been formed with the elimination of two molecules of water. In contrast to what might have been expected, the di-tolyl fructitol from this reaction oxidizes to terephthalic acid, identified by its dimethyl ester melting at 139° C. The di-tolyl-fructitol formed a tetraacetate of melting point 110-112° C. This tetraacetate analyzed as 66.84% carbon and 7.07% hydrogen in comparison to the calculated values for $C_{20}H_{22}O_4(C_2H_3O)_4$ of 67.4% carbon and 6.8% hydrogen. Hydrogenation of this diaryl fructitol shows that only one of the aromatic nuclei is hydrogenated. The hydrogenation results in a pure product in the form of white needle crystals melting at 179-181° C. The elemental analysis of the hydrogenated diaryl fructitol shows that it contains 71.27% carbon and 9.49% hydrogen in comparison to the calculated value for $C_{20}H_{32}O_4$ of 71.5% carbon and 9.5% hydrogen.

EXAMPLE V

This example illustrates the reaction of sorbose, a ketose sugar, with toluene. In this example 260 grams of toluene is contacted with 36 grams of sorbose in the presence of 134 grams of anhydrous aluminum chloride. This reaction was carried out at about 40° C. for about 3 hours' time. Here again, a large excess of toluene was utilized along with a 5:1 molar ratio of aluminum chloride to sorbose.

The product was separated into a water-soluble segment, a toluene-soluble segment, and a water and toluene insoluble segment. From the water and toluene insoluble segment (amounting to 39.3 grams) was separated 30 grams by exhaustive extraction with water. This substance after recrystallization from isopropyl alcohol yielded a ditolyl-sorbitol with a melting point of 102–103° C. The pure product, in the form of white needle crystals was found by elemental analysis to contain 73.11% carbon and 7.93% hydrogen which values compare well with those calculated for $C_{20}H_{26}O_4$ of 72.70% carbon and 7.93% hydrogen. This di-tolyl-sorbitol oxidizes to yield terephthalic acid which was identified by the melting point of its dimethyl ester of 138.5–139.5° C. Attempts to prepare an acetate derivative yielded only a syrup-like product.

Fructose as utilized in Example IV and sorbose as utilized in Example V are ketoses which differ only in the configuration of one of their carbon atoms. Thus, by reaction with toluene they each gave respectively a di-tolyl-fructitol and a di-tolyl-sorbitol. That these compounds are not identical is plainly evident from the difference in their melting points.

EXAMPLE VI

This example illustrates the reaction of a disaccharide, sucrose, with toluene. This example was carried out in substantially the same manner as described hereinabove. In this experiment, 260 grams of toluene was contacted with 17.3 grams of sucrose in the presence of 70 grams of aluminum chloride. This reaction was carried out at about 60° C. for 5.25 hours.

The product after hydrolysis was filtered, separating the product into a toluene and water insoluble white solid and into a filtrate composed of a light amber toluene layer and a colorless water layer. From the solid material after repeated fractional crystallizations was obtained both 1,1-di-para-tolyl-1-desoxy-glucitol and also di-para-tolyl-fructitol. The di-tolyl-glucitol melted at 154–155° C. after recrystallization from water and its mixed melting point with a pure sample was not depressed. The di-tolyl-fructitol after recrystallization from water melted at 195–197° C. and did not depress a pure sample of the di-tolyl-fructitol obtained as shown in Example IV Thus, the reaction products obtained from sucrose, a disaccharide composed of one glucose unit and one fructose unit, are the same as compounds formed by independently reacting toluene with glucose and with fructose.

I claim as my invention:

1. A process which comprises reacting an aromatic compound selected from the group consisting of aromatic hydrocarbons and haloaromatic compounds consisting of carbon, hydrogen and nuclear halogen with a carbohydrate selected from the group consisting of monosaccharides, naturally occurring desoxymonosaccharides, omega-carboxy-monosaccharides, and oligo-saccharides in the presence of a catalytic amount of a Friedel-Crafts metal halide at reaction conditions of temperature and pressure to produce a compound selected from the group consisting of aryl-substituted desoxy-alditols, haloaryl-substituted desoxy-alditols, aryl-substituted desoxy-ketitols, and haloaryl-substituted desoxy-ketitols, and recovering said compound.

2. A process which comprises reacting an aromatic hydrocarbon with a carbohydrate selected from the group consisting of monosaccharides, naturally-occurring desoxy-monosaccharides, omega-carboxy-monosaccharides, and oligosaccharides in the presence of a catalytic amount of a Friedel-Crafts metal halide at reaction conditions of temperature and pressure to produce a compound selected from the group consisting of aryl-substituted desoxy-alditols and aryl-substituted desoxy-ketitols, and recovering said compound.

3. A process which comprises reacting a haloaromatic compound consisting of carbon, hydrogen and nuclear halogen with a carbohydrate selected from the group consisting of monosaccharides, naturally-occurring desoxy-monosaccharides, omega-carboxy-monosaccharides, and oligosaccharides in the presence of a catalytic amount of a Friedel-Crafts metal halide at reaction conditions of temperature and pressure to produce a compound selected from the group consisting of haloaryl-substituted desoxy-alditols and haloaryl-substituted ketitols, and recovering said compound.

4. A process which comprises reacting an aromatic hydrocarbon with a carbohydrate selected from the group consisting of monosaccharides, naturally-occurring desoxy - monosaccharides, omega-carboxy-monosaccharides, and oligosaccharides in the presence of a catalytic amount of aluminum chloride at reaction conditions of temperature and pressure to produce a compound selected from the group consisting of aryl-substituted desoxy-alditols and aryl-substituted desoxy-ketitols, and recovering said compound.

5. A process which comprises reacting a haloaromatic compound consisting of carbon, hydrogen and nuclear halogen with a carbohydrate selected from the group consisting of monosaccharides, naturally-occurring desoxy-monosaccharides, omega-carboxy-monosaccharides, and oligosaccharides in the presence of a catalytic amount of aluminum chloride at reaction conditions of temperature and pressure to produce a compound selected from the group consisting of haloaryl-substituted desoxy-alditols and haloaryl-substituted ketitols, and recovering said compound.

6. A process which comprises reacting an aromatic hydrocarbon with a carbohydrate selected from the group consisting of monosaccharides, naturally occuring desoxy-monosaccharides, omega-carboxy monosaccharides, and oligosaccharides in the presence of a catalytic amount of aluminum chloride at a temperature of from about room temperature to about 100° C., and at a pressure of from about atmospheric to about 100 pounds per square inch to produce a compound selected from the group consisting of aryl-substituted desoxy-alditols and aryl-substituted desoxy-ketitols, and recovering said compound.

7. A process which comprises reacting a haloaromatic compound consisting of carbon, hydrogen and nuclear halogen with a carboxyhydrate selected from the group consisting of monosaccharides, naturally occurring desoxy-monosaccharides, omega-carboxy monosaccharides, and oligosaccharides in the presence of a catalytic amount of aluminum chloride at a temperature of from about room temperature to about 100° C. and at a pressure of from about atmospheric to about 100 pounds per square inch to produce a compound selected from the group consisting of haloaryl-substituted desoxy-alditols and haloaryl-substituted ketitols, and recovering said compound.

8. A process which comprises reacting an aromatic hydrocarbon with a monosaccharide in the presence of a catalytic amount of aluminum chloride at a temperature of from about room temperature to about 100° C. and at a pressure of from about atmospheric to about 100 pounds per square inch to produce a compound selected from the group consisting of aryl-substituted desoxy-alditols and aryl-substituted desoxy-ketitols, and recovering said compound.

9. A process which comprises reacting an aromatic hydrocarbon with a disaccharide in the presence of a catalytic amount of aluminum chloride at a temperature of from about room temperature to about 100° C. and at a pressure of from about atmospheric to about 100 pounds per square inch to produce a compound selected from the group consisting of aryl-substituted desoxy-alditols and aryl-substituted desoxy-ketitols, and recovering said compound.

10. A process which comprises reacting a haloaromatic compound consisting of carbon, hydrogen and nuclear halogen with a monosaccharide in the presence of a catalytic amount of aluminum chloride at a temperature of from about room temperature to about 100° C. and at a pressure of from about atmospheric to about 100 pounds per square inch to produce a compound selected from the group consisting of haloaryl-substituted desoxy-alditols and haloaryl-substituted ketitols, and recovering said compound.

11. A process which comprises reacting chlorobenzene with glucose in the presence of a catalytic amount of aluminum chloride at a temperature of from about room temperature to about 100° C. and at a pressure of from atmospheric to about 100 pounds per square inch to produce a chlorophenol desoxy-glucitol, and recovering said compound.

12. A process which comprises reacting toluene with sucrose in the presence of a catalytic amount of aluminum chloride at a temperature of from about room temperature to about 100° C. and at a pressure of from about atmospheric to about 100 pounds per square inch to produce a compound selected from the group consisting of aryl-substituted desoxy-alditols and aryl-substituted desoxy-ketitols, and recovering said compound.

13. A process which comprises reacting an aromatic hydrocarbon with a ketose in the presence of a catalytic amount of aluminum chloride at a temperature of from about room temperature to about 100° C. and at a pressure of from about atmospheric to about 100 pounds per square inch to produce an aryl-substituted desoxy-ketitol, and recovering said compound.

14. A process which comprises reacting toluene with fructose in the presence of a catalytic amount of aluminum chloride at a temperature of from about room temperature to about 100° C. and at a pressure of from about atmospheric to about 100 pounds per square inch to produce a para-tolyl-desoxy-fructitol, and recovering said compound.

15. A process which comprises reacting an aromatic hydrocarbon with an aldose in the presence of a catalytic amount of aluminum chloride at a temperature of from about room temperature to about 100° C. and at a pressure of from about atmospheric to about 100 pounds per square inch to produce an aryl-substituted desoxy-alditol, and recovering said compound.

16. A process which comprises reacting benzene with glucose in the presence of a catalytic amount of aluminum chloride at a temperature of from about room temperature to about 100° C. and at a pressure of from about atmospheric to about 100 pounds per square inch to produce a phenyl-substituted desoxy-glucitol, and recovering said compound.

17. A process which comprises reacting toluene with glucose in the presence of a catalytic amount of aluminum chloride at a temperature of from about room temperature to about 100° C. and at a pressure of from about atmospheric to about 100 pounds per square inch to produce para-tolyl-desoxy-glucitol, and recovering said compound.

References Cited in the file of this patent
UNITED STATES PATENTS

| 2,252,725 | Niederl | Aug. 19, 1941 |
| 2,460,803 | Bonner et al. | Feb. 8, 1949 |
| 2,472,276 | Bonner et al. | June 7, 1949 |